(12) United States Patent
Moritz

(10) Patent No.: US 8,373,292 B2
(45) Date of Patent: Feb. 12, 2013

(54) FRAME STRUCTURE FOR SUPPORTING A WIND POWER PLANT

(75) Inventor: Bertil Moritz, Västerås (SE)

(73) Assignee: HM Power AB, Västerås (SE)

( * ) Notice: Subject to any disclaimer, the term of this patent is extended or adjusted under 35 U.S.C. 154(b) by 296 days.

(21) Appl. No.: 12/989,573

(22) PCT Filed: Apr. 17, 2009

(86) PCT No.: PCT/SE2009/050396
§ 371 (c)(1),
(2), (4) Date: Oct. 25, 2010

(87) PCT Pub. No.: WO2009/131523
PCT Pub. Date: Oct. 29, 2009

(65) Prior Publication Data
US 2011/0037272 A1    Feb. 17, 2011

(30) Foreign Application Priority Data
Apr. 24, 2008   (SE) ...................................... 0800945

(51) Int. Cl.
*F03B 13/00* (2006.01)
(52) U.S. Cl. ........................................... 290/44; 290/55
(58) Field of Classification Search .................... 290/44, 290/55
See application file for complete search history.

(56) References Cited

U.S. PATENT DOCUMENTS

| 4,335,319 | A | 6/1982 | Mettersheimer, Jr. | |
|---|---|---|---|---|
| 6,294,844 | B1 | 9/2001 | Lagerwey | |
| 7,075,189 | B2 | 7/2006 | Heronemus et al. | |
| 2001/0002757 | A1 | 6/2001 | Honda et al. | |
| 2005/0206168 | A1* | 9/2005 | Murakami et al. | 290/55 |
| 2008/0240864 | A1* | 10/2008 | Belinsky | 290/55 |
| 2011/0037264 | A1* | 2/2011 | Roddier et al. | 290/44 |

FOREIGN PATENT DOCUMENTS

| DE | 32 24 976 | 1/1984 |
|---|---|---|
| DE | 197 27 330 | 1/1999 |
| DE | 198 46 796 | 4/2000 |
| EP | 1 106 825 | 6/2001 |
| NL | 1008318 | 8/1999 |
| WO | 99/02856 | 1/1999 |
| WO | 00/58621 | 10/2000 |
| WO | 02/073032 | 9/2002 |
| WO | 03/076800 | 9/2003 |
| WO | 2005/040604 | 5/2005 |
| WO | 2007/009464 | 1/2007 |

* cited by examiner

*Primary Examiner* — Tho D Ta
(74) *Attorney, Agent, or Firm* — Drinker Biddle & Reath LLP

(57) ABSTRACT

The present invention refers to an arrangement ("A") related to a body of water for creating conditions for generating electric power from a prevailing force of wind ("W").
Utilized pontoon units are made up of and associated with at least two vertical, or at least essentially vertical, posts, which may float, for forming a frame portion and at least one upright stabilizing the position of the frame portion in the body of water.
More particularly, the invention indicates that between an upright and each one of the two posts, a first post and a second post, there extends a bar-shaped means dimensioned for taking up a compressive force, and that between said upright and each one of the first and second posts there extends at least one first means dimensioned for taking up a tractive force and at least one second means dimensioned for taking up a tractive force.

28 Claims, 4 Drawing Sheets

Figure 10:
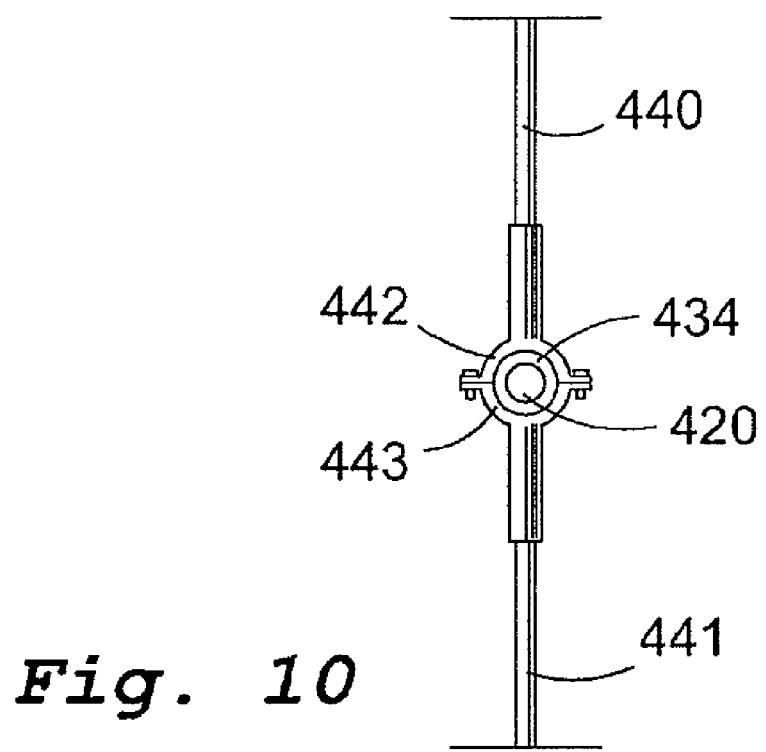

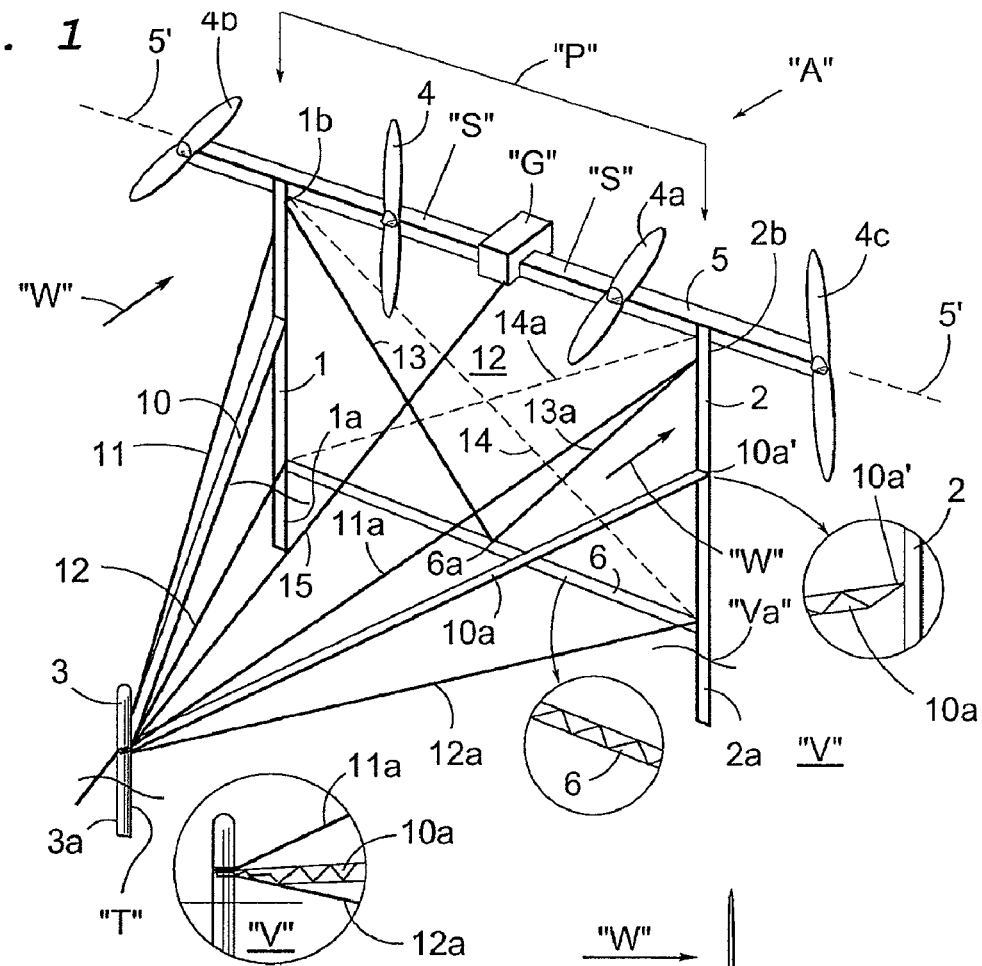
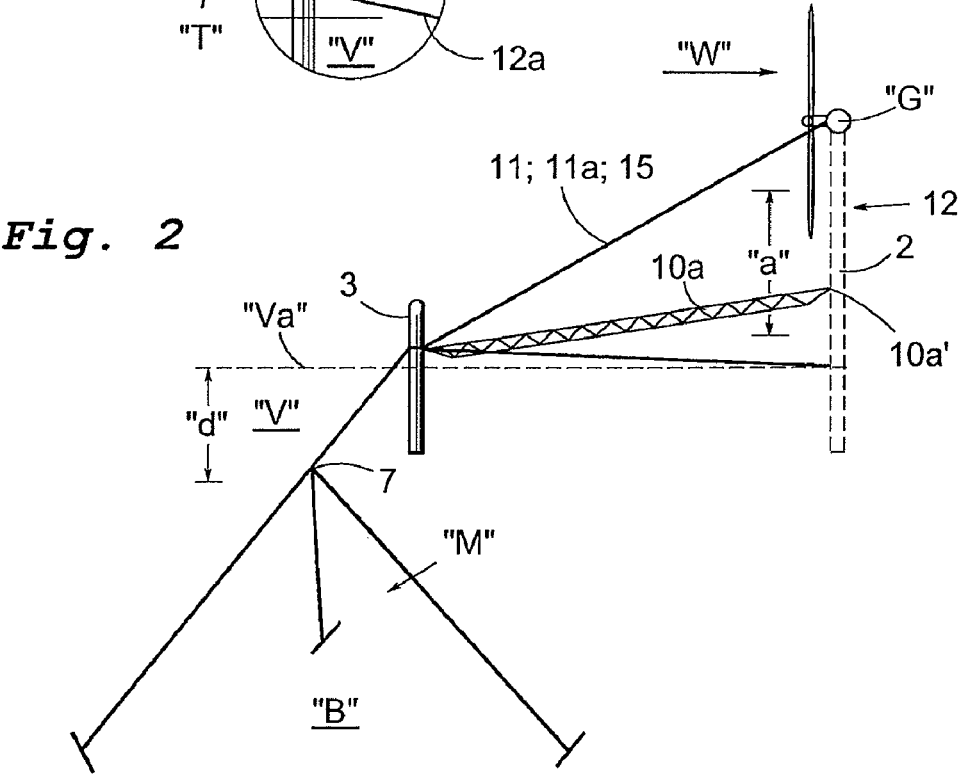

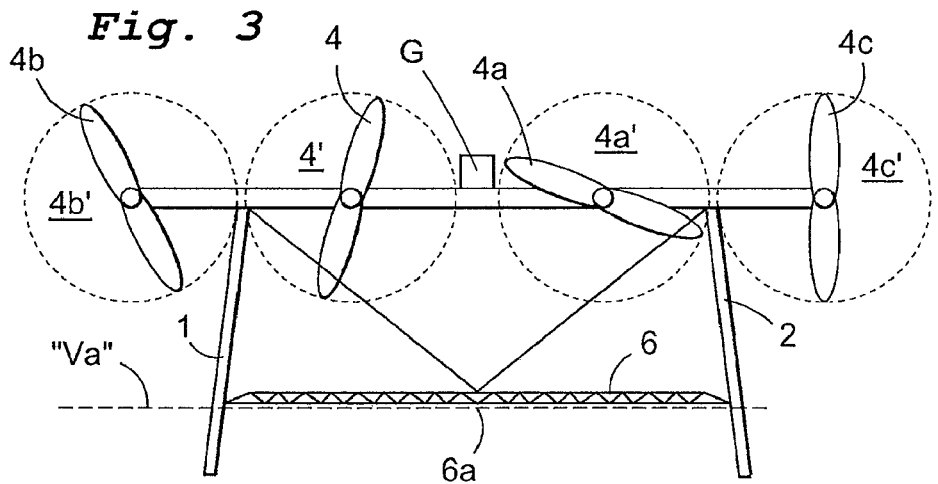
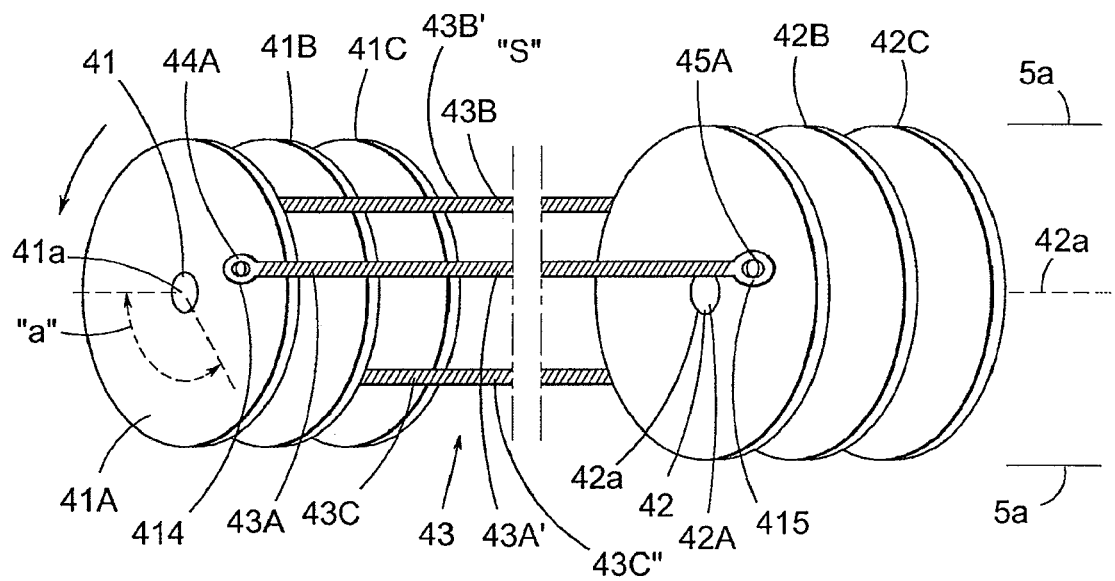
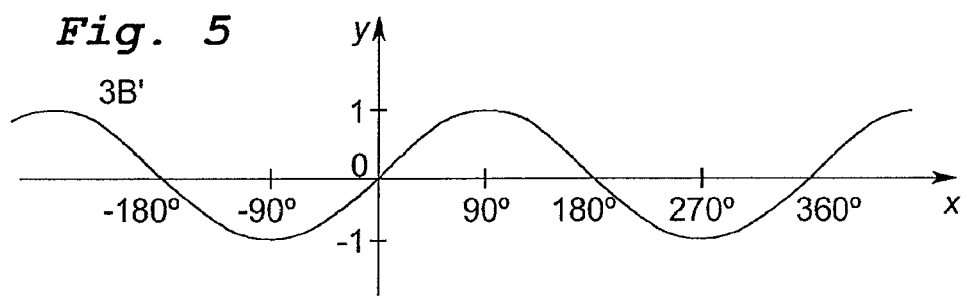

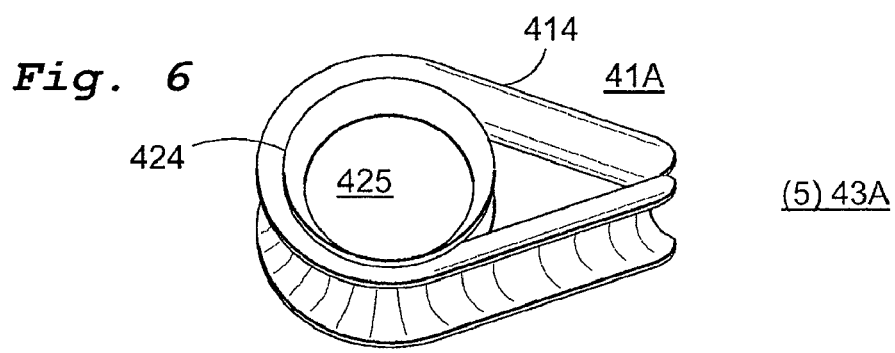
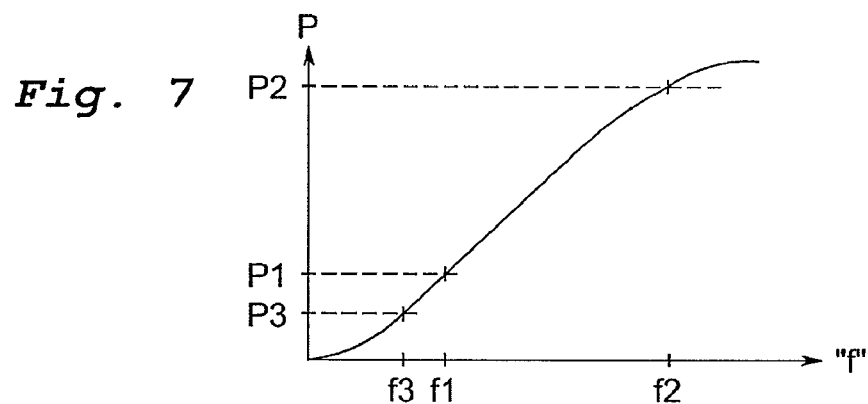
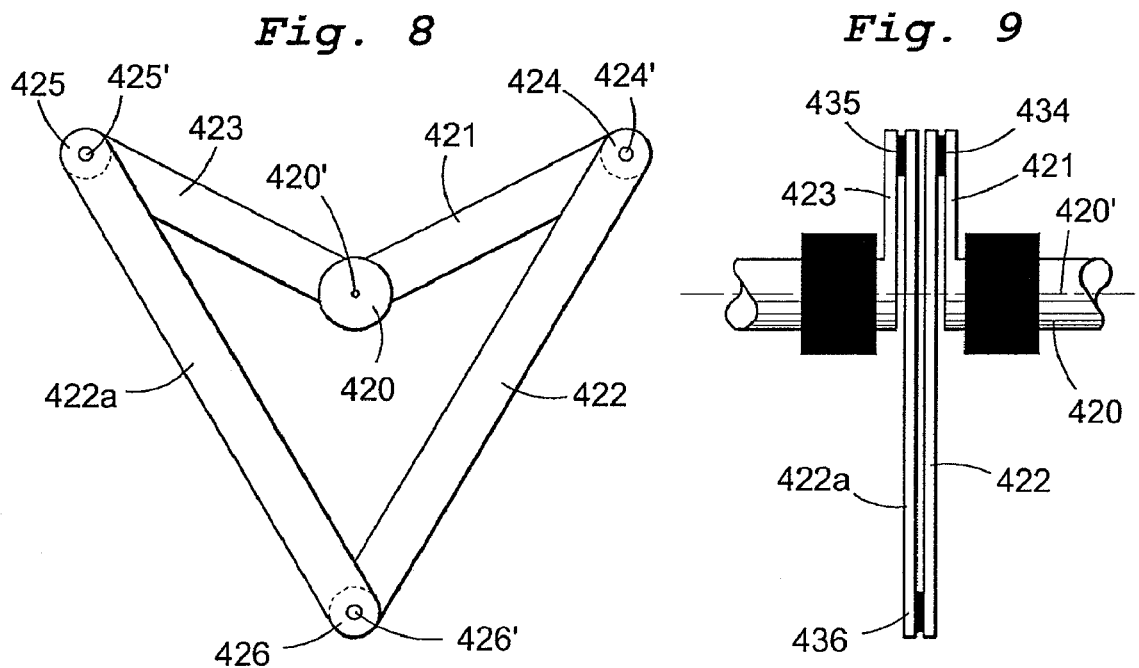

_US 8,373,292 B2_

FRAME STRUCTURE FOR SUPPORTING A WIND POWER PLANT

CROSS REFERENCE TO RELATED APPLICATIONS

This application is the National Stage of International Application No. PCT/SE2009/050396, filed Apr. 17, 2009, and claims benefit of Swedish Application No. 0800945-8, filed Apr. 24, 2008.

TECHNICAL FIELD OF THE INVENTION

This invention refers generally to an arrangement related to a body of water and more particularly to an arrangement for creating conditions from a prevailing wind force for making possible the generation of electric power.

Arrangements of this kind must comprise a; individual but coordinated pontoon units that can float in the body of water, b; a plurality of, at least two, turbines (wind-driven propellers) positioned adjacent to each other and coordinated, c; a mooring system solidly anchored to a limited bottom area of said body of water, d; a generator unit for being driven by the rotating motion of a turbine for generating said electric power, e; a cable section connected on the one hand to said generator unit and on the other hand to a land-based distribution network distributing generated electric power.

More particularly said pontoon units are to be structured by and associated with at least two vertical, or at least substantially vertical, posts which may float so as to form a frame portion.

In any case, an upright stabilizing the position of the frame portion in the body of water is proposed.

Furthermore, said two posts are adapted to be able to support a horizontally oriented beam structure which is "flexurally rigid" in itself.

The beam structure is then to be adapted and dimensioned such, that it will be able to support a plurality of said wind turbines.

Each one of said two posts as well as the upright are dimensioned and/or adapted in such manner with respect to each other that with their lower portions submerged in said body of water they maintain the frame portion with the beam structure floating over the surface of the water.

Furthermore, said upright is to be laterally displaced in a plane, oriented through said frame portion and said two posts, and with the upright being adapted on the one hand to cooperate "torsion resistantly" with said frame portion and on the other hand to be attached to and to cooperate with said mooring system so as to hold on to this.

BACKGROUND OF THE INVENTION

Methods, arrangements and structures related to the technical field disclosed above and having a function and a character fulfilling requirements set up are known earlier in a plurality of embodiments.

With regard to arrangements of the relevant type it is known earlier to structure necessary pontoons or pontoon units so that the latter rest and float on a water surface or to structure them as floating vertical posts with associated ballast.

As examples of the first-mentioned category the contents of the following patent publications may be mentioned; NL-1008 318; EP-1 106 825-A2; US-G 294 844-B1; DE-32 24 976-A1; DE-197 27 330-A1; WO-00158621-A1; DE-198 46 796-A1 and WO-02/073032-A1.

As examples of the last-mentioned category the contents of patent publications WO-2005/040 604-A2 and WO-03/076 800-A2 may be mentioned.

If the basic conditions associated with the relevant invention are considered, the subject matter of patent publication WO-2007/009 464-A1, particularly FIGS. 1 and 2, may be noted as the earlier standpoint of technology.

An arrangement related to a body of water is shown and described here, more specifically an arrangement for creating conditions for generating electric power from prevailing wind forces.

The arrangement comprises a; individual but coordinated pontoon units that may float in the body of water, a plurality of at least two, wind turbines (wind-driven propellers) oriented adjacent to each other and coordinated, c; a mooring system solidly anchored to a limited bottom area of said body of water, d; a generator unit for being driven by the rotating motion of a turbine for generating said electric power, e; a cable section connected on the one hand to said generator unit and on the other hand to a land-based distribution network distributing generated electric power.

More particularly, said pontoon units are to be structured by and associated with at least two vertical or at least substantially vertical posts that may float for i.a. forming a vertical frame portion.

In any case, an upright or the like stabilizing the vertical position of the frame portion in the body of water will have to exist.

Said two posts are flexurally rigid in themselves and are furthermore adapted to be able to vertically support a beam structure which in itself is flexurally rigid and is horizontally oriented.

The beam structure is to be adapted and dimensioned such, that it will be able to support a plurality of said turbines.

Each one of the two mentioned posts and said upright are dimensioned such with regard to each other and/or adapted so that with their lower partial portions submerged in said body of water they maintain a frame portion floating vertically over the water surface.

Furthermore, said upright is to be laterally displaced by one plane, oriented through said frame portion and said two posts, and with the upright being adapted on the one hand to flexurally rigidly cooperate with said frame portion and on the other hand to be attached to and attachedly be able to cooperate with said mooring system.

STATEMENT OF THE PRESENT INVENTION

Technical Problem

In view of the circumstance that the technical considerations that a person skilled in the art in the relevant technical field must carry out in order to offer a solution of one or more posed technical problems are on the one hand initially a necessary insight in the measures and/or the sequence of measures to be taken and on the other hand and a necessary choice of the one or more means that are necessary, with regard thereto, the following technical problems should be relevant in producing the present subject of invention.

Considering the earlier standpoint of technology as it is described above, it must therefore be seen as a technical problem to be able to understand the significance of the advantages associated with and/or the technological measures and considerations which will be necessary for creating, in an arrangement related to a body of water, and more particularly in an arrangement for creating conditions for generating electric power, offering a light structure which is based on utilizing two or more vertical posts, one or more vertical uprights, one or more bar-shaped means dimensioned for specifically taking up compressive force, and a plurality of means dimensioned for specifically taking up tractive force.

Arrangements of this type are based on an earlier known arrangement which is to include a; individual but coordinated pontoon units that are displaceable in the body of water, b; a plurality of at least two, turbines (wind-driven propellers) oriented adjacent to each other and coordinated, c; a mooring system solidly anchored to a limited bottom area for said body of water, d; a generator unit for being driven by the rotating motion of a turbine for generating said electric power, e; a cable section connected on the one hand to said generator unit and on the other hand to a land-based distribution network distributing generated electric power.

More specifically said pontoon units are to be structured by and associated with at least two vertical, or at least substantially vertical, posts that can float so as to form the main part of a frame portion.

Furthermore, said two posts are to be adapted to be able to support a horizontally oriented beam structure which is flexurally rigid in itself.

The beam structure is to be adapted and dimensioned such, that it will be able to support said turbines.

Each one of said two posts together with said upright are mutually dimensioned and/or adapted such, that with their lower partial portions submerged into said body of water they will cause the frame portion to be held vertically and i.a. with the beam structure floating over the surface of the water.

Additionally, said upright is to be displaced sideways in a plane, oriented by said frame portion, the beam structure and the two said posts, and with the upright adapted on the one hand to rotatably rigidly cooperate with said frame portion and/or the posts and on the other hand to be attached to and be made to cooperate adheringly with said mooring system.

There is a technical problem in being able to understand the significance of, the advantages related to and/or the technical measures and considerations which will be required for letting be shown the utilization of and the coordination of one or more bar-shaped means dimensioned for taking up a compressive force and a plurality of means cooperating with said bar-shaped means dimensioned for taking up a tractive force.

There is a technical problem in being able to understand the significance of, the advantages associated with and/or the technical measures and considerations that will be required for letting the entire system be structurally flexurally rigid by means of a unique coordination between a bar-shaped means and at least two means dimensioned for taking up tractive forces.

There is a technical problem in being able to understand the significance of, the advantages associated with and/or the technical measures and considerations which will be required to make possible the creation of an arrangement which is directly adapted to application at sea and thereby to be able to handle the strains that may be referred to the manner in which a hard wind affects the wind turbines as well as a heavy sea and which can be constructed with a comparatively low dead weight.

There is a technical problem in being able to understand the significance of, the advantages associated with and/or the technical measures and considerations which will be required for applying between said upright and each one of the two posts, a first post and a second post, at least one bar-shaped means dimensioned for taking up a compressive force.

There is a technical problem in being able to understand the significance of the advantages associated with and/or the technical measures and considerations which will be required in order to let a first means dimensioned for taking up a tractate force extend between said upright and each one of the first and second posts and preferably at least one second means dimensioned fix taking up a tractive force.

There is a technical problem in being able to understand the significance of the advantages related to and/or the technical measures and considerations which will be required for letting the first and second means for taking up tractive forces, as in the form of one or more wires or similar, be attached to the first and the second posts, and, if so, preferably on each side of and above and below a selected attachment point for one or more of the bar-shaped means.

There is a technical problem in being able to understand the significance of, the advantages related to and/or the technical measures and considerations which will be required for letting a bar-shaped means be attachable to its associated post in a defined middle area oriented between an instructed upper beam structure and a water surface belonging to the body of water.

There is a technical problem in being able to understand the significance of, the advantages related to and/or the technical measures and considerations which will be required for letting a horizontally oriented beam unit, such as dimensioned for compressive forces, be adapted to cooperate with one each of the two posts and in that case in the vicinity of but above, a water surface belonging to the body of water.

There is a technical problem in being able to understand the significance of the advantages related to and/or the technical measures and considerations which will be required for letting one or more third means dimensioned for taking up a tractive force between a centrally oriented fastening point for said horizontal beam unit and an upper portion, on the one hand for the first and on the other hand for the second post, alternatively said beam structure, extend to one or more third means dimensioned for taking up traction.

There is a technical problem in being able to understand the significance of, the advantages related to and/or the technical measures and considerations which will be required for letting one or more fourth means dimensioned for taking up a tractive force to be adapted to cooperate with the two posts and then close to, but slightly above, a water surface belonging to the body of water.

There is a technical problem in being able to understand the significance of, the advantages related to and/or the technical measures and considerations which will be required for letting the fourth means dimensioned for taking up the tractive force be oriented to extend between the lower portion of the first post and the upper portion of the second post or vice versa.

There is a technical problem in being able to understand the significance of, the advantages related to and/or the technical measures and considerations which will be required for letting a single generator unit be adapted, over a system transferring a rotational movement enclosed in the beam structure, to be driven by a plurality of wind turbines associated with and supported by the beam structure.

There is a technical problem in being able to understand the significance of, the advantages related to and/or the technical measures and considerations which will be required for letting said upright be adapted and dimensioned for being able to cooperate with and/or be enclosed in a transformer unit.

There is a technical problem in being able to understand the significance of, the advantages related to and/or the technical measures and considerations which will be required for letting said transformer unit be placed such within the upright, that it will serve as a ballast.

There is a technical problem in being able to understand the significance of, the advantages related to and/or the technical measures and considerations which will be required thr letting associated means taking up tractive forces, such means in the form of wires, being in cooperation with and in connection with bars, posts or the like taking up tractive forces, thereby forming a structure of a "rigid" triangle.

There is a technical problem in being able to understand the significance of, the advantages related to and/or the technical measures and considerations which will be required for letting the number of turbines which are to be associated with the beam structure be chosen to exceed two and to fall below six, such as four.

There is a technical problem in being able to understand the significance of, the advantages related to and/or the technical measures and considerations which will be required for letting all turbines be adapted for direct cooperation with the arrangement transferring the rotational motion and set for mutually synchronous operation.

There is a technical problem in being able to understand the significance of, the advantages related to and/or the technical measures and considerations which will be required for letting, over said synchronous operation, the propellers of the individual turbines be adapted such, that they will partially overlap each other's circular surface of coverage.

There is a technical problem in being able to understand the significance of, the advantages related to and/or the technical measures and considerations which will be required for letting one or more of said bar-shaped means dimensioned for taking up traction be structured as one or more pipe sections. One or more trellis structures, so as to cause the dead weight and the exposable surface which will face an eye of the wind and the direction of the waves to be reduced.

There is a technical problem in being able to understand the significance of, the advantages related to and/or the technical measures and considerations which will be required for letting said turbine and/or turbines be arranged and adapted directly to cooperate with the arrangement transferring the rotational movement without associated gearboxes.

There is a technical problem in being able to understand the significance of, the advantages related to and/or the technical measures and considerations which will be required for letting the mentioned vertically oriented posts have an elliptical, or at least substantially elliptical, cross-section with its main axis or major axis oriented parallel to the lengthwise orientation of the beam structure so as to reduce a surface portion which can make lateral displacement of the arrangement more difficult.

There is a technical problem in being able to understand the significance of the advantages related to and/or the technical measures and considerations which will be required for letting each one of said vertically oriented posts be hollow and form a floating body, such as having cylindrical or elliptical cross-sectional shape.

There is a technical problem in being able to understand the significance of the advantages related to and/or the technical measures and considerations which will be required for permitting a reduction of the influence of a wave motion and letting the action occur over a reduction of the cross-sectional surface which is located adjacent to the surface of the water and intended to face the eye of the wind.

There is a technical problem in being able to understand the significance of, the advantages related to and/or the technical measures and considerations which will be required for letting each one of or selected means taking up tractive forces be end relatedly attached over one or more hinge connections, such as i.a. to each one of the posts.

There is a technical problem in being able to understand the significance of the advantages related to and/or the technical measures and considerations which will be required in order to let all turbines be coordinated in one and the same or at least essentially in one and the same vertical plane, such as a vertical plane side-related to the be structure.

There is a technical problem in being able to understand the significance of the advantages related to and/or the technical measures and considerations which will be required for letting the two mentioned posts within said frame portion and in a vertical plane be tended a converging orientation upwards.

There is a technical problem in being able to understand the significance of, the advantages related to and/or the technical measures and considerations which will be required for letting the converging orientation be allowed to relieve the compressive strain on the lower beam unit which at that time can be exchanged for one or more means taking up traction.

There is a technical problem in being able to understand the significance of the advantages related to and/or the technical measures and considerations which will be required for letting said upright be adapted to take a vertical position, such as being affected by ballast, so as to thereby exhibit a "flexurally rigid" attachment to said posts.

There is a technical problem in being able to understand the significance of, the advantages related to and/or the technical measures and considerations which will be required for letting a selected anchoring arrangement be adapted to exhibit a point of fixation.

There is a technical problem in being able to understand the significance of the advantages related to and/or the technical measures and considerations which will be required for letting said point of fixation be adapted to such depth below the surface of the water that this point of fixation with increasing and stronger force of wind will lower the upright in such manner as to let the angular setting of the posts and frame portion be reduced in relation to a vertical plane.

There is a technical problem in being able to understand the significance of, the advantages related to and/or the technical measures and considerations which will be required for letting said beam structure have a hollow profile and surround the arrangement transferring said rotational movement for driving one single generator unit.

There is a technical problem in being able to understand the significance of, the advantages related to and/or the technical measures and considerations which will be required fix letting said generator unit be centrally oriented to the beam structure.

The Solution

The invention takes as its starting point the known technology mentioned by way of introduction for an arrangement related to a body of water for creating conditions for generating electric power comprising a; individual but coordinated pontoon units that may float in the body of water, b; a plurality of, at least up to two, turbines (wind-driven propellers) oriented adjacent to each other and coordinated, c; a mooring system solidly anchored to a limited bottom area of said body of water, d; a generator unit for being driven by the rotational movement of a turbine for generating said electric energy, and e; a cable section connected on the one hand to said generator unit and on the other hand to a land-based distribution network distributing generated electric power, wherein said pontoon units are structured by and in each case allotted two posts which may float by themselves, are vertical or at least essentially vertical, for forming a frame portion and at least one upright stabilizing the position of the frame portion in the body of water, said two posts being adapted to be able to support a horizontally oriented beam structure which is flexurally rigid in itself, said beam structure being adapted and dimensioned such, that it can support said turbines, with each one of said posts as well as said uprights being dimensioned and/or adapted such, that with their lower partial portions being lowered into said body of water they maintain the frame portion floating over the surface of the water, with said upright being displaced sideways one plane, oriented by said frame portion and said two posts, and with said upright being adapted on the one hand to cooperate rotatably rigidly with said frame portion and on the other hand to be attached to and attachingly be able to cooperate with said mooring system.

In order to be able to solve one or more of the technical problems mentioned above the present invention more particularly refers to supplementing known technology by extending between said upright and each one of the two posts, a first post and a second post, a bar-shaped means dimensioned for taking up compression and that between said upright and each one of the first and second posts extends a first means dimensioned for taking up a tractive force and preferably a second means dimensioned for taking up a tractive force.

As suggested embodiments falling within the frame of the basic concept of the present invention, it is additionally indicated that the first and second means, such as in the form of a wire or similar, is to be fastened to the first and second posts on individual sides of and, if desired, over and below an attachment point for the bar-shaped means.

It is further indicated that the bar-shaped means is to be fastened to its associated posts within a defined middle area oriented between the beam structure and a water surface belonging to the body of water.

A beam unit dimensioned as for compressive forces can be adapted to cooperate with the two posts in the vicinity of, but above, the water surface belonging to the body of water.

Between a centrally oriented point of attachment of said beam unit and an upper portion of the first and second posts there extends a third means dimensioned for taking up as tractive force.

A fourth means dimensioned for taking up a tractive force is to be adapted to cooperate with the two posts in the vicinity of and somewhat above a water surface belonging to the body of water.

The fourth means dimensioned for taking up the tractive three is to be oriented to extend between the lower portion of the first post and the upper portion of the second post in the plane of the frame portion or conversely.

On single generator unit is then to be adapted to be driven by a plurality of turbines associated with the beam structure by means of an arrangement transferring rotational movement.

Said upright is then to be adapted to be able to cooperate with and/or enclose a transformer unit.

Said transformer unit should then be placed within the upright so that it will serve as ballast.

The invention indicates that coordinated means taking up tractive forces, said means being in the form of wires, shall in cooperation with and in connecting with means taking up compressive forces, said means being in the form of bars or the like, shall be able to form the structure of a triangle.

The number of turbines which are to be coordinated with the beam structure should appropriately be chosen to exceed two and to be below six, such as four.

All turbines are here adapted for direct cooperation with the arrangement transferring a rotational motion for synchronous operation.

Over said synchronous operation the propellers of the individual turbines can be adapted to overlap the circular area of coverage of each other.

Said bar-shaped means dimensioned for taking up a compressive force are structured as one or more tube portions, one or more trellis structures, for thereby making the dead load decrease.

Said turbine and/or turbines should be arranged and adapted to be able to cooperate with the arrangement transferring the rotational movement without associated gearboxes.

Said vertically oriented posts can be provided with an elliptical or at least substantially elliptical cross-section having its main axis or major axis oriented parallel to the lengthwise orientation of the beam structure.

Furthermore it is suggested that each of said posts should be hollow and form a floating body such as with a cylindrical or elliptical cross-sectional shape.

A reduction of the effect of wind power and wave motions and their influence can occur here by means of a reduction of the cross-sectional area which is intended to face the eye of the wind.

Each one of or selected means for taking up compressive forces is to be end relatedly attached by means of a hinge connection such as to the posts with an associated rotatably rigid attachment by utilized means taking up tractive force.

The invention directs that all turbines should be arranged cooperatingly in one and the same or at least substantially one and the same vertical plane such as a flat side-related beam structure.

Said two posts within said frame portion have a converging orientation in upwards direction in a vertical plane.

The converging orientation is intended to relieve the compressive forces on a lower beam unit which then can be replaced by one or more means taking up tractive forces.

Said upright is adapted to assume a vertical position, if desired over actuation of ballast, and to exhibit a flexurally rigid attachment to said posts.

A chosen anchoring system is adapted to exhibit a point of fixation, with said point of fixation being adapted to such depth under the surface of the water that with an increasing and stronger force of the wind and an increasing level of the waves this point of fixation will lower the upright so as in such manner to cause a reduction of the angular setting of the pontoon unit and the frame portion as related to a vertical plane.

Said beam structure is shaped as a hollow profile and surrounds the mentioned system transferring rotational motion for driving a generator unit.

Furthermore, said generator unit is to be centrally oriented with regard to the hewn structure.

Advantages

The advantages which primarily must be considered to be characterizing for the present invention and the thereby particularly significant characteristics set forth are that hereby conditions have been created for, in an arrangement related to a body of water and more particularly to an arrangement for creating conditions for, generating electric power from the force of a prevailing wind.

Arrangements of this type shall then comprise a; individual but coordinated pontoon units which may float in the body of water, b; a plurality of at least two, adjacent to each other oriented and coordinated turbines (wind-driven propellers), c; a mooring system solidly anchored to a limited bottom area of said body of water, d; a generator unit that may be driven by the rotational motion of a turbine for generating said electric power, and e; a cable section connected on the one hand to said generator unit and on the other hand to a land-based distribution network distributing generated electric power.

More specifically said pontoon units are to be structured by and associated with at least two vertical or at least essentially vertical posts that may float for i.a. forming a frame portion.

Under all circumstances an upright stabilizing the position of the frame portion in the body of water will have to be included.

Furthermore, said two posts are adapted to be able to support a horizontally oriented beam structure which is flexurally rigid in itself.

The beam structure is to be adapted and dimensioned such, that it will be able to support said turbines.

Each one of said two posts together with said uprights are dimensioned and/or adapted in such manner with regard to each other that with their lower portions immersed in said body of water they will keep the frame portion floating over the water surface.

Said uprights are to be laterally displaced by one plane oriented through said frame portion and said two posts, with said upright being adapted to cooperate flexurally rigidly with said frame portion and to be attached to and to cooperate retainingly with said mooring system and with means for devices dimensioned for absorbing compressive threes and with means dimensioned for taking up tractive threes to offer a lightweight structure and for an intended application at sea.

More particularly it is indicated that between said upright and each one of the two posts, a first post and a second post, there is to extend a bar-shaped means dimensioned for taking up pressure and that between said upright and each one of the first and second posts is to extend at least one first means dimensioned for taking up a tractive force and preferably a second means dimensioned for taking up a tractive force so as to form a triangle.

The subject matter that must be considered to characterize the present invention is stated in the characterizing portion of claim 1 in the following.

SHORT DESCRIPTION OF THE DRAWINGS

Figure 11:
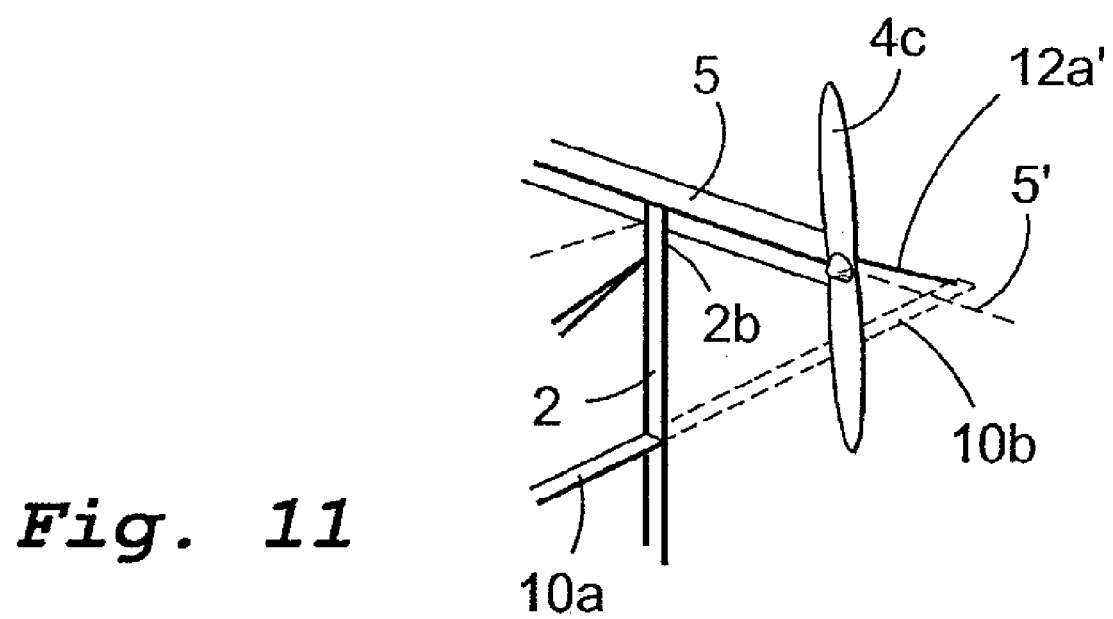

An embodiment proposed at present and showing the significant characteristics associated with the present invention will now be described more specifically for exemplifying purposes with references to the accompanying drawing, in which FIG. 1 shows a perspective view of the greater portion of an arrangement exhibiting the significant characteristics and features associated with the present invention, FIG. 2 shows the arrangement in accordance with claim 1 in a side view and parallel to a prevailing direction of the wind, FIG. 3 shows the arrangement according to claim 1 in a front view and considered in a direction from an eye of the wind associated with the direction of the wind, FIG. 4 shows a perspective view of force transferring means or an arrangement created in accordance with the principles of the invention with three force transferring units adapted for solely or to a substantial amount a traction force, FIG. 5 shows a sine curve so as to illustrate the variation of pulling force actuation which can be expected from a single one of said units with a pulling function, whereby the two remaining units will become mutually phase shifted by 120° in force, FIG. 6 shows a perspective view of an eyelet, without a cooperating wire, wherein said eyelet is to surround an eccentric pin within an associated bearing member, FIG. 7 shows a curve for tractive force/extension, valid for a unit in the form of a wire, FIG. 8 shows a proposed application of the torque transferring arrangement in a wind power plant that may float, wherein four propellers are to cooperate with a torque transferring arrangement—not shown—and which latter arrangement is to drive a generator as a unit so as to generate electric power, FIG. 9 shows a lateral view of an alternative arrangement of the embodiment of FIG. 4 with a crankshaft and with three attached units, FIG. 10 shows a proposed attachment of the end portions of two wire parts to the shaft portion of a crankshaft and FIG. 11 illustrates an arrangement lacking means for taking up tractive forces (12a in FIG. 1).

DEFINITIONS

"Pontoon units" refers to one or several vertical posts (1, 2) and/or uprights (3) having their lower portions submerged in a body of water.

"Beam structure" refers to a flexurally rigid structure which can support a selected number of wind turbines and a generator unit and which can enclose an arrangement transferring a rotational motion.

"A bar-shaped means dimensioned for taking up compressive fortes" refers to a structure which primarily is dimensioned to be able to take up compressive forces but which also can take up tractive forces.

"Means dimensioned for taking up tractive forces" refers to a structure which primarily is dimensioned for being able to take up tractive forces but with minor or no requirements of being able to take up compressive forces.

DESCRIPTION OF A PRESENTLY PROPOSED EMBODIMENT

By way of introduction it should be mentioned that in the following description of a presently proposed embodiment which shows the significant characteristics associated with the invention and which are clarified by the Figures illustrated in the following drawings we have selected wording and specific terminology with the purpose of thereby primarily letting the gist of the invention appear clearly.

However, in this connection it should be noted that the terminology chosen here must not be considered as limiting solely to the terms utilized and selected here and it should be understood that each term selected in this manner is to be interpreted such, that it additionally comprises all technical equivalents which function in the same or substantially the same manner so as to enable the same or essentially the same purpose and/or technical result to be achieved.

Thus, with reference to the accompanying drawings not only is the present invention disclosed schematically and in detail but also the significant peculiarities associated with the invention have been made specific by the embodiment now proposed and more closely described in the following.

Thus FIGS. 1 to 3 (and FIG. 11) show an arrangement "A" related to a body of water for creating conditions for generating electric power from a prevailing wind force "W".

The arrangement comprises a; individual but coordinated pontoon units 1, 2, 3 which may float in the body of water "V", b; a plurality of, at least two, wind turbines (wind-driven propellers) 4, 4a, 4b and 4c, respectively, oriented adjacently to each other and coordinated, c; mooring system "M" securely anchored to a limited bottom area "B" of said body of water "V", d; a generator unit "G" which may be driven by a rotating motion of a turbine for generating said electric power, and e; a cable section (not shown) connected on the one hand to said generator unit "G" and on the other hand to a land-based distribution network (not shown) distributing generated electric power.

Said pontoon units 1, 2, 3 are made up of and associated with at least two vertical or at least essentially vertical posts 1, 2 which may float for together with additional structural etc. meats and means forming a frame portion 12 and with at least one upright 3 stabilizing the position of the frame portion in the body of water.

Although the present invention will be described with two posts 1, 2 and one upright 3 in the following it should be noted that this embodiment can be expanded with more posts and more uprights than the ones shown and utilized here as a minimum requirement.

Said two posts 1, 2 are adapted to be able to support a horizontally oriented beam structure which is flexurally rigid in itself, said beam structure 5 being adapted and dimensioned in such manner that it can support said turbines 4, 4a, 4h, 4c and that each one of said posts 1, 2 together with said upright 3 is dimensioned and/or adapted such, that with their lower partial portions 1a, 2a, 3a submerged in said body of water "V" they keep the whole frame portion 12 floating over the water surface "Va", with said upright 3 being displaced sidewise a plane "P" oriented through said frame portion 12 and said two posts 1, 2.

The upright 3 is adapted to cooperate "flexurally rigidly" with said frame portion 12 on the one hand and to be attached to and to cooperate in securing said mooring system "M" on the other hand.

The "flexurally rigid" attachment and cooperation referred to imply that the upright 3 and the post 1 (alternatively the post 2) are provided with a bar-shaped means 10 which with its end portions is rotatably attached to the upright 3 and to the post 1 but with the flexurally rigid attachment being achieved by means 11, 12 taking up tractive forces.

Alternatively the means 12 (12a) can be replaced by a means 12a' in FIG. 11 attached to the upper portion 2b of the post 2 and a flexurally rigid extension 10b associated with a bar 10a.

More particularly, the invention indicates that between said upright 3 and each one of the two posts, a first post 1 and a second post 2, there extend a bar-shaped means dimensioned for taking up pressure, a means 10 for the left hand post 1 and a similar means 10a for the right hand post 2.

Between said upright 3 and each one of the first post 1 and the second post 2 there extends on the one hand a first means 11 dimensioned for taking up a tractive force and in FIG. 1 on the other band a second means 12 dimensioned for taking up a tractive force.

The first means 11 is related to the left hand post 1 and the first means 11a is related to the right hand post 2.

The second means 12 is related to the left hand post 1 and the second means 12a is related to the right hand post 2.

The first means 11, 11a and the second means 12, 12a, such as in the form of a wire with turnbuckles or the like, are attached to the first post 1 and the second post 2 in known manner, viz. on each side of and above the rotatable lower attachments 10' and 10a' of the bar-shaped means 10 and 10a, respectively.

The bar-shaped means 10, 10a are attached to their associated posts 1 and 2, respectively within a defined middle area "a" (see FIG. 2) oriented between the beam structure 5 and a water surface "Va" associated with the body of water.

A beam unit 6, such as dimensioned primarily for compressive forces, is adapted to co-operate rotatably with the two posts 1, 2 close to but above a water surface "Va" belonging to the body of water.

Between a centrally oriented attachment point 6a of said beam unit 6 and an upper portion 1b of the first post 1 as well as an upper portion 2b of the second post 2, alternatively said beam structure 5, there extends a third means 13, 13a dimensioned for taking up a tractive force.

A fourth means 14 (shown by a dashed line in FIG. 1) is adapted to cooperate with the two posts 1, 2 in the vicinity of and somewhat above the water surface "Va" belonging to the body of water.

The fourth means 14, 14a dimensioned for taking up the tractive force are oriented to extend between the lower portion 1a of the first post and the upper portion 2b of the second post 2 or conversely and are therefore only outlined in FIG. 1.

A single generator unit "G" is adapted to be driven by a plurality of turbines 4, 4a, 4b, 4c associated with the beam structure 5 by means of a system "S" transferring the rotational motion.

Said upright 3 is adapted to be able to cooperate with and/or enclose a transformer unit "T".

Said transformer unit "T" is at that time placed within the upright 3 so that it will serve as ballast for said upright 3.

Cooperating means taking up tractive forces, said means being in the form of wires, are in conjunction with and in connection with bars taking up compressive forces or the like to form a stationary structure of a triangle.

The number of turbines 4, 4a, 4b, 4c which are to be coordinated with beam structure 5 is chosen to be greater than two and to be lower than six, such as four.

All the wind turbines 4, 4b; 4a, 4c are adapted for cooperating directly with the arrangement "S" for transferring the rotational motion for synchronously driving the propellers.

By means of said synchronous operation the propellers of the individual turbines 4-4c are adapted to overlap the circular coverage area 4", 4a', 4b, and 4c" of each other.

Said means 1, 2, 3, 5, 6, 10 and 10a, respectively, dimensioned for taking up compressive forces are structured as one or more pipe portions, one or more trellis structures, so as to reduce the dead load.

More specifically, these should have little or no capability of floating and should have a small actuation surface.

Said wind turbine and/or wind turbines are arranged and adapted to cooperate directly with the arrangement "S" transferring the rotational movement without associated gearboxes.

Said vertically oriented posts 1, 2, can then be provided with a circular or an elliptical or at any rate essentially circular or elliptical cross-section having its main axis or major axis oriented parallel to the lengthwise orientation 5' of the beam structure 5.

Each one of the said posts 1, 2 and the upright 3 can be hollow so as to form a buoyant body having a cylindrical or an elliptical cross-sectional shape or other some other cross-sectional shape.

A reduction of the influence of a wave motion and the effect thereof occurs by a reduction of the surface which is intended to face the eye of the wind, which surface can be a trellis structure of known technology.

Each one of or selected means 10, 10a; 1, 2, 3; 5; 6 is end relatedly attached to an individual hinge connection with such a hinge connection being given the reference designation 10a' such as to posts 1, 2.

All the turbines 4-4c are associated in one and the same or at least substantially in one and the same vertical plane, such as a plane "P" through the frame portion 12 and the side related beam structure 5.

Said two posts 1, 2 in said frame portion 12 are in a vertical plane "P" associated with a converging orientation upwards in accordance with FIG. 3.

The converging orientation is intended to relieve the compressive forces on the lower beam unit 6 which then can be replaced with one or more fourth means designated 14, 14a for taking up tractive forces.

Said upright 3 is adapted to take a vertical position by being effected by ballast and is by means 10, 11, 12; 10a, 11a, 12a (12a') attached flexurally rigidly to said posts 1, 2.

A chosen anchoring arrangement "M" is adapted to have a well-defined point of fixation 7.

Said point of fixation 7 is adapted to such depth "d" below the surface "Va" of the water that when the three of the wind increases and becomes stronger this point of fixation 7 will lower the upright 3 so as to permit the angular setting of the pontoon unit and the frame portion 12 related to a vertical plane "P" to be reduced.

Said beam structure 5 has a hollow profile and surrounds the mentioned arrangement "S" transferring said rotational motion for driving a generator unit "G", wherein said generator unit should be centrally oriented with regard to the beam structure 5.

FIG. 4 has the purpose of clarifying an arrangement for transferring a rotational motion or arrangement "S" having a first wheel 41 driven to a rotational motion around a first axis of rotation 41a and a second wheel 42 driven to a rotational motion around a second axis of rotation 42a over a force transferring means 43.

Runners 41A, 41B, 41C and 42A, 42B, 42C, respectively, are coordinated with these axes 41a, 42a.

Said force transferring means 43 are eccentrically coordinated on the one hand with said first axis of rotation 41a and its wheel 41B and on the other hand with said second axis of rotation 42a and its wheel 42B over bearing means associated with the end portions of the means 43.

The known technology is based on utilizing a flexurally rigid bar which is intended and dimensioned to be able to handle both compressive forces and tractive forces.

FIG. 4 has the purpose of schematically illustrating that a chassis 5a is to be positioned displaceably along parallel rail sections within the beam structure 5.

According to the present invention three different power transferring units 43A, 43B and 43C are utilized, which are included in said force transferring means 43.

Said units 43A, 43B and 43C are here shaped identically equal, and theretofore only unit 43A will be made the subject of a more specific description.

Unit 43A is adapted to cooperate eccentrically on the basis of individual hearing means 44A, 45A together with said first shaft 41 and said second shaft 42.

Each one of said units 43A, 43B and 43C is with its attachment points to its wheels 41A, 42A; 41B, 42B and 41C, 42C or crankshafts distributed around the first axis of rotation 41a and the second axis of rotation 42a.

It is indicated here that a central angle "a" or a circular measure between each one of said units 43A and 43B on an individual wheel or crankshaft 41A, 41B is chosen equal and that each one of said units is dimensioned for distinct tractive strains.

As said force transferring units 43A, 43B and 43C a wire structure, a steel wire structure are utilized.

Said wire structure exhibits end related splices so as thereby to be able to form end related loops (not shown).

However, said end related loops are adapted to support one eyelet each which here are-designated 414, 415 in FIG. 6.

Each of said loops and/or eyelets 414, 415 is adapted to surround a ball bearing or roller bearing 424 which in turn is adapted to interact with a pin 425 which is allotted to an eyelet 425 and which is attached to wheel 41A.

FIG. 4 clarifies in its perspective view that one of said units 43A, 43B and 43C is located in a vertical plane side related to each other for a free rotating motion.

According to the present invention it is instructed that each one of said units 43A, 43B, and 43C is to be prestressed between said first shaft 41 and said second shaft 42 over means not shown in the drawing and being extendable and curtailable to such extent that each unit 43A, 43B and 43C, irrespectively of the chosen take up of force, will exhibit an extended condition, particularly for a transfer of tractive force.

Thus, at an upper position of a wire section 43B', this section should present a highest tensile stress "P2" (activated load and initial pretension) having a length extension "f" falling within the area "f1" and "f2", whereas at a lower position of a wire section 43C" this section should exhibit a lower tensile stress "P3" (relieved load but with a pretension) having a change of length "f" falling within the range of "f1" and "f3". Thus the clamping force will have a correspondence in the force "P1". This may be seen in FIG. 7.

With reference to FIG. 4 this shows that the wheel 41 which is driven around a first axis of rotation 41a, the wheel 42 which is driven around a second axis of rotation 42a etc, are adapted each to be driven by a wind-driven propeller.

An additional driven shaft cooperates with a generator unit "G" for generating electric power. The feed-out of this power is not shown.

With reference to FIGS. 8, 9, and 10, respectively, different views show crankshaft 420 with its rotatable central axis 420' and having three arms 421, 422, 423 attached to said crankshaft and with said units 43A, 43B and 43C being attached to connecting points 424, 425, and 426, respectively.

The utilized crankshaft 420 is to be capable of being produced in a plurality of individual parts (and not in one single forged part in which slide hearings and sensitive lubrication are required and in which the dimensions are limited).

Thus, a crankshaft 420 will consist of individual shanks 421, 422, and 423 having shafts 424', 425' and 426' which are screwed together in manner known per se around shaft 420'.

The utilized ball bearings 434, 435, and 436 and similar can be slid over a utilized shaft so as to be able to offer a structure which requires less lubrication and provides a longer length of life.

FIG. 10 illustrates that two units 440, 441 are united to each other over a two-part bearing cup 442, 443 over a ball bearing 434 which is allotted to crankshaft 420.

Within the scope of the invention the case also occurs that between the first and second shafts there can be disposed an extra crankshaft which then is to be adapted as a passive crankshaft to transfer items that can cause transversal oscillations. Such an additional passive crankshaft only transforms torques and hence it would be possible to make its dimensions considerably smaller than the other ones.

The pretension "f1" according to the invention and shown in FIG. 7 can then be achieved by, with the assistance of separate means, extending or shortening the distance of the means between shafts 41a, 42a within a pipe covering the arrangement.

As an alternative an intermediate wheel or the like may be raisable and lowerable so as to enable in this manner extending or shortening element 43B' to its chosen pretension. Nothing prevents this intermediate wheel from cooperating with a spring arrangement which in its turn is coordinated with a shock-absorbing arrangement.

Such an intermediate wheel is not specifically described in the description nor is a spring arrangement with or without a shock-absorbing arrangement as such means are well-known in their technical field.

The extension of means 43C in position 43C" suggested by the invention has the purpose of increasing the point of natural frequency so that extended distances (between the wind turbines 4b; 4) do not become the object of a self-oscillation.

Although prestressed wires are suggested here, rods 43A, 43B and 43C can also be utilized in the present invention.

The drawing shows that the distance between upright 3 and post 2 is chosen to be 103 meters and that upright 3 extends a distance of 20 meters below the surface of the water.

The blades of the wind turbine are given a diameter of 60 meters and the wind turbines 4' and 4a' are separated a distance of 8.7 meters by the generator.

The distance between 421 and 432 has been chosen as 0.55 meters.

The invention is of course not limited to the embodiment disclosed above as an example and can be subjected to modifications within the frame of the inventive concept illustrated in the following claims.

It should particularly be noted that each illustrated unit and/or circuit can be combined with each of other illustrated units and/or circuits within the frame of being able to achieve a desired technical function.

The invention claimed is:

1. An arrangement related to a body of water for creating from a prevailing wind force conditions for generating electric power, comprising a; individual but coordinated pontoon units that may float in the body of water, b; a plurality of, at least two, turbines (wind-driven propellers) oriented adjacent to each other and coordinated, e; a mooring system solidly anchored to a limited bottom area of said body of water, d; a generator unit for being driven by the rotating motion of said turbines for generating said electric power, e: a cable section connected on the one hand to said generator unit and on the other hand to a land-based distribution network distributing generated electric power, said pontoon units being structured of and associated with at least two vertical, or at least substantially vertical, posts which may float forming a frame portion and in any case an upright stabilizing the position of the frame portion in the body of water, with said two posts being adapted to be able to support a horizontally oriented beam structure which in itself is flexurally rigid, said beam structure being adapted and dimensioned such, that it can support said turbines, with each one of said two posts together with said upright being dimensioned and/or adapted such, that with their lower partial portions submerged in said body of water they permit said frame portion to be retained floating over the surface of the water, wherein said upright is displaced sideways in a plane, oriented by said frame portion and said two posts, and wherein said upright is adapted to cooperate with said frame portion and to be attached to and to be adherently made to cooperate with said mooring system, wherein between said upright and each one of the two posts, a first post and a second post, there extends a bar-shaped means dimensioned for taking up a compressive force and that between said upright and each one of the first and second posts there extends at least one first means dimensioned for taking up a tractive force and furthermore an additional second means dimensioned for taking up a tractive force.

2. An arrangement in accordance with claim 1, wherein the first and second means such as in the shape of a wire or similar are attached to the first and second posts on opposite sides of and above and below an attachment for the bar-shaped means.

3. An arrangement in accordance with claim 1, wherein the bar-shaped means is attached to its associated post within a defined intermediate area ("a") oriented between the beam structure and a water surface ("Va") belonging to the body of water.

4. An arrangement in accordance with claim 1, wherein a beam unit such as dimensioned for compressive forces is adapted to cooperate with the two posts in the vicinity of but above a water surface belonging to the body of water.

5. An arrangement in accordance with claim 1, wherein between a centrally oriented attachment point for a beam unit and an upper portion for the first and second posts, alternatively said beam structure, there extends a third means dimensioned for taking up a tractive force.

6. An arrangement in accordance with claim 1, wherein a fourth means dimensioned for taking up a tractive force is adapted to cooperate with the two posts in the vicinity of, and slightly above, a water surface belonging to the body of water.

7. An arrangement in accordance with claim 1, wherein a fourth means dimensioned for taking up a tractive force is oriented to extend between the lower portion of the first post and the upper portion of the second post or conversely.

8. An arrangement in accordance with claim 1, wherein a single generator unit ("G") is adapted to be driven over an arrangement ("S") transmitting a rotational motion by a plurality of wind turbines associated with the beam structure.

9. An arrangement in accordance with claim 1, wherein said upright is adapted to be able to cooperate with and/or contain a transformer unit ("T").

10. An arrangement in accordance with claim 1, wherein said transformer unit is positioned such within the post that it will serve as a ballast.

11. An arrangement in accordance with claim 1, wherein cooperating means, in the form of wires, taking up tractive force are in cooperation with and in connection with pressure absorbing bars or the like to form a structure of a triangle which is flexurally rigid in its plane.

12. An arrangement in accordance with claim 1, wherein the number of turbines which are to be coordinated with the beam structure is chosen to exceed two and to be lower than six, such as four.

13. An arrangement in accordance with claim 1, wherein all the turbines are adapted for directly cooperating with the arrangement ("S") transferring rotational motion for synchronous operation.

14. An arrangement in accordance with claim 13, wherein the propellers of the individual turbines are over said synchronous operation adapted to overlap the circular coverage surface of each other.

15. An arrangement in accordance with claim 1, wherein said bar-shaped medium dimensioned for taking up tractive force is structured as one or more pipe portions, one or more framework structures, for thereby reducing the dead weight.

16. An arrangement in accordance with claim 1, wherein said turbine and/or turbines are arranged and adapted to cooperate directly with the arrangement transferring rotational motion without associated gearboxes.

17. An arrangement in accordance with claim 1, wherein said vertically oriented posts are provided with an elliptical or at least substantially elliptical cross-section having its main axis or major axis oriented parallel to the lengthwise orientation of the beam structure.

18. An arrangement in accordance with claim 1, wherein each one of said posts is hollow and forms a buoyant body of cylindrical or elliptical cross-sectional shape.

19. An arrangement in accordance with claim 1, wherein a reduction of the effect and influence of a wave motion occurs by a reduction of the exposable surface that is intended to face an eye of the wind.

20. An arrangement in accordance with claim 1, wherein each one of or selected ones of the pressure absorbing means taking up tractive force are attached in end-to-end relationships over a hinge connection, such as to the posts.

21. An arrangement in accordance with claim 1, wherein all of the turbines are coordinated in one and the same or at least substantially one and the same vertical plane, such as a plane side-related to the beam structure.

22. An arrangement in accordance with claim 1, wherein said two posts are within said frame portion subjected to a converging orientation upwards.

23. An arrangement in accordance with claim 22, wherein the converging orientation is intended to relieve the compressive strain on a lower beam unit which then can be replaced by one or more means taking up tractive forces.

24. An arrangement in accordance with claim 1, wherein said upright is adapted to assume a vertical position over the influence of a ballast and exhibits a flexurally rigid attachment to said posts.

25. An arrangement in accordance with claim 1, wherein a chosen anchoring arrangement is adapted to exhibit a point of fixation.

26. An arrangement in accordance with claim 25, wherein said point of fixation is adapted to such depth below the surface of water that in an increasing and stronger force of wind and/or wave height this point of fixation will lower the upright so as in this manner to reduce the angular positioning of the pontoon unit and the frame portion related to a vertical plane.

27. An arrangement in accordance with claim 1, wherein said beam structure has the form of a hollow profile and surrounds the mentioned arrangement transferring said rotational motion for driving a generator unit.

28. An arrangement in accordance with claim 27, wherein said generator unit is centrally oriented to the beam structure.

* * * * *